United States Patent Office 3,288,985

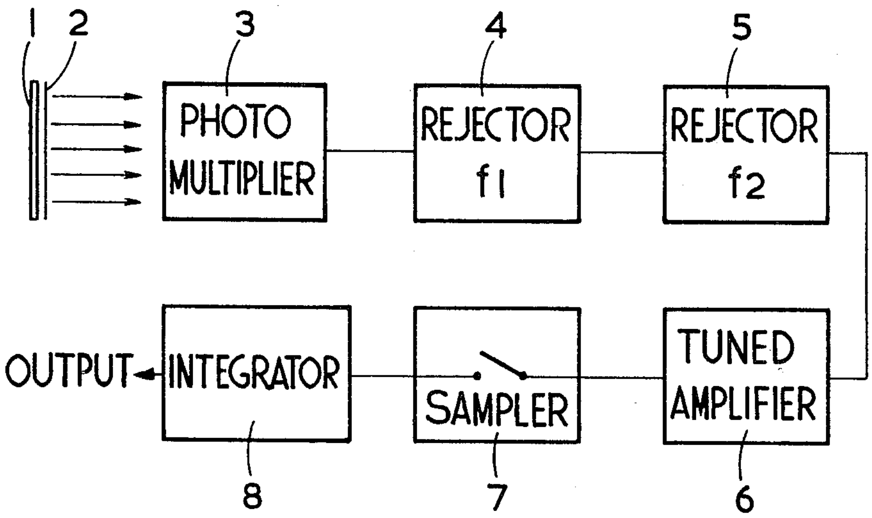
1
2
3
4
5
PHOTO MULTIPLIER
REJECTOR f1
REJECTOR f2
OUTPUT
INTEGRATOR
SAMPLER
TUNED AMPLIFIER
8
7
6

Patented Nov. 29, 1966

3,288,985

DIGITAL INFORMATION STORAGE APPARATUS

George Richard Hoffman, Sale, and Peter Lumsden Jones, Bramhall, Stockport, England, assignors to National Research Development Corporation, London, England, a corporation of Great Britain Filed Sept. 4, 1962, Ser. No. 221,199
Claims priority, application Great Britain, Sept. 5, 1961, 31,926/61
3 Claims. (Cl. 235—61.11)

This invention relates to digital information storage apparatus. It is concerned with storage apparatus of the kind comprising a panel containing a matrix of electro-luminescent cells.

In such apparatus information in binary digital form is stored by the individual cells being screened or not screened by a mask, which can comprise a punched card or photographic negative, positioned in front of the panel. The presence or absence of screening in front of a cell at a particular location indicates the storage of one or other binary digit (a "0" or "1") at that location.

It is an object of the invention to enable information stored at any selected location to be read.

According to the invention digital information storage apparatus comprises a matrix of electro-luminescent cells each corresponding to a digit location and electrically connected in rows and in columns, a stored binary digit being represented by the screening or not screening of a cell, and means for reading the digital information at a selected location comprising means for energising the row containing the selected location at a first frequency, means for energising the column containing the selected location at a second frequency, and a light indicator sensitive to the difference frequency between said first and second frequencies for indicating the presence or absence of screening at the selected location.

The light indicator can comprise a photo-multiplier and an electronic amplifier selectively tuned to said difference frequency.

In an embodiment of the invention the output of the tuned amplifier can be sampled at the difference frequency and fed to an integrator which will produce an output of one polarity when the cell at the selected location is not screened but will produce no output when the cell is screened.

In order that the invention can be more fully understood reference will be made to the drawing accompanying this specification, the single figure of which shows an embodiment thereof in block diagrammatic form.

Referreing to the drawing there is shown therein a panel 1 containing a matrix of electro-luminescent cells electrically connected in rows and in columns. One example of such a panel comprises a glass base carrying a sandwich of phosphor cells provided between two orthogonal sets of parallel conducting lines which respectively form rows and columns, the cells being situated at the intersections of the lines. One set of lines is transparent so that when an alternating voltage is applied between any two lines at right angles, light emitted from the cell at the intersection may be observed through the glass base. Such a panel can be constructed with a large number of cells per square centimetre thus achieving compact storage.

Electrical connections are provided to each row and to each column through suitable selection switches which enable any one row and any one column to be selected, the remaining rows and columns being grounded. If an alternating voltage relative to ground of a first frequency $f_1$ is applied to a selected row and simultaneously a voltage relative to ground of a second frenquency $f_2$ is applied to a selected column it will be appreciated that all the cells in the selected row and all the cells in the selected column will emit light and the light beams from the selected row will be modulated at the frequency $f_1$ while the light beams from the selected column will be modulated at the frequency $f_2$. Furthermore since the conversion of an electrical signal to a light signal in a cell is non-linear the cell at the intersection of the selected row and column will emit light at the difference frequency $f_3$ between $f_1$ and $f_2$.

A mask 2 is positioned in front of the panel 1 and contains holes or light transparent regions in front of certain of the cells while the remaining cells are screened. Thus the presence or absence of light modulated at the frequency $f_3$ will indicate whether or not the cell at the selected location is screened. The presence of such light is detected by means of a photo-multiplier 3 which converts the light modulation into an electrical signal. The presence of the frequency $f_3$ in this electrical signal can then be detected by suitable apparatus one form of which is described herein.

In the described embodiment the output of photo-multiplier 3 is first fed through two rejection circuits 4 and 5 which are respectively arranged to reject signals of frequency $f_1$ and frequency $f_2$. The output of these rejectors is then applied to an amplifier 6 which is tuned to the frequency $f_3$. The presence or absence of an output from amplifier 6 determines which binary digit is stored at the selected location. Since, however the tuned amplifier produces a sinusoidal output this signal cannot usually be used directly in a digital computer but requires further modification.

One method of treating the output signal from amplifier 6 is to pass it through a sampler 7 in the form of an electronic switch which is operated at the difference frequency $f_3$. By a suitable choice of the phase of the operation of the sampler 7 relative to tthe phases of the input signals $f_1$ and $f_2$ to the panel output, pulses can be obtained from sampler 7 which are successively of the same polarity and correspond to the peaks of the sinusoidal wave output from amplifier 6. These pulses can be integrated in an integrator 8, the output of which can be shaped into square pulses in any conventional manner.

There are several factors involved in the choice of suitable values for the frequencies $f_1$ and $f_2$. For a fast access time to the store the difference frequency $f_3$ should be high since it will be appreciated that the information cannot be read out in less than $$\frac{1}{2f_3}$$

seconds. Therefore, the upper frequency $f_1$ should be high as possible. However, the construction of the panel is such that the transparent conductive lines and the capacitors formed by the electro-luminescent cells form an attenuation line. At high frenquencies the phase change and the attenuation of the applied voltage becomes significant. The upper limit of operating frequency of one construction of a panel having 128 rows and columns in which the size of each cell is 0.3 millimeter square and is separated by 0.2 millimetre from its neighbour was about 750 kc./s.

The lower frequency $f_2$ should be significantly greater than the difference $f_3$ otherwise the fundamental or the harmonics of $f_2$ may occur within the pass band of the tuned amplifier. With the panel mentioned above in which the band-width of the amplifier 6 was 160 kc./s., $f_1$ were 667 and 500 kc./s. respectively giving a value of 167 kc./s. for $f_3$.

A limitation on the access time of the store is the effect of background noise which is mainly produced in the photo-multiplier 3. Use of a sampler 7 and integrator 8 causes the sampled noise component to produce low frequency fluctuations at the output of the integrator, these fluctuations having zero average value. Thus if the panel is energised for a sufficient number of cycles the integrator output will rise sufficiently for the D.C. output from the integrator to be above the noise level and be detectable.

A further effect which should be avoided is the leakage of light from a selected cell which is screened through holes in the mask at adjacent positions to give a spurious reading. To minimise this it is desirable to place the mask as close as possible to the surface of the panel and if possible to arrange for unwanted light to be totally internally reflected. This will occur if the thickness $t$ of the medium, usually glass, between the cells and the mask is such that $t$ is equal to or less than $$\frac{c}{\tan \theta_c}$$

where $\theta_c$ is the critical angle between the medium and air and $c$ is the cell separation. The effect of leakage can also be avoided by placing the mask between the matrix of electro-luminescent cells and the transparent supporting base of the panel. This results in a permanent store the information in which can only be altered by replacing the panel. However the change of the contents of a fixed store is a comparatively rare event.

We claim:

1. Digital information storage apparatus comprising a matrix of electro-luminescent cells each corresponding to a digit location and electrically connected in rows and in columns, a stored binary digit being represented by the screening or not screening of a cell, and means for reading the digital information at a selected location comprising means for energising the row containing the selected location at a first frequency, means for energising the column containing the selected location at a second frequency, and a light sensitive device arranged to receive light from unscreened cells to provide an electrical signal corresponding in frequency to the frequency of incident light, rejection circuits for filtering out components of said signal at said first and second frequencies, an amplifier tuned to said difference frequency for amplifying the filtered signal, a sampler comprising an electronic switch operated at said difference frequency and adjustable in phase for sampling the output of said amplifier and an integrator fed with the output of the sampler for providing a signal of one polarity when the cell at a selected location is not screened and for providing no output when said cell is screened.

2. The store as claimed in claim 1 and including a mask carrying information in the form of opaque and transparent areas in which a transparent support medium is interposed between the cell matrix and the mask, the thickness of the medium being less than $$\frac{c}{\tan \theta_c}$$

where $c$ is the separation between adjacent cells and $\theta_c$ is the critical angle between the medium and air.

3. The store as claimed in claim 4 and including a mask carrying digital information in the form of opaque and transparent areas in which the mask is interposed between the cell matrix and a transparent support medium.

References Cited by the Examiner

UNITED STATES PATENTS 3,145,368 8/1964 Hoover ............ 340—173

ROBERT C. BAILEY, *Primary Examiner.*

G. D. SHAW, *Assistant Examiner.*